US011200401B2

(12) United States Patent
Sonna Momo et al.

(10) Patent No.: US 11,200,401 B2
(45) Date of Patent: Dec. 14, 2021

(54) METHOD AND DEVICE FOR BIOMETRIC VASCULAR RECOGNITION AND/OR IDENTIFICATION

(71) Applicant: GLOBAL ID SA, Lausanne (CH)

(72) Inventors: Lambert Sonna Momo, Romont (CH); Luciano Cerqueira Torres, Vevey (CH); Sebastien Marcel, Martigny (CH); André Anjos, Vevey (CH); Michael Liebling, Sulpice (CH); Adrian Shajkofci, Martigny (CH); Serge Amoos, Sion (CH); Alain Woeffray, Sion (CH); Alexandre Sierro, Sion (CH); Pierre Roduit, Sion (CH); Pierre Ferrez, Sion (CH); Lucas Bonvin, Sion (CH)

(73) Assignee: Global ID SA, Lausanne (CH)

( * ) Notice: Subject to any disclaimer, the term of this patent is extended or adjusted under 35 U.S.C. 154(b) by 0 days.

(21) Appl. No.: 16/965,210

(22) PCT Filed: Jan. 29, 2019

(86) PCT No.: PCT/IB2019/050708
§ 371 (c)(1),
(2) Date: Jul. 27, 2020

(87) PCT Pub. No.: WO2019/150254
PCT Pub. Date: Aug. 8, 2019

(65) Prior Publication Data
US 2020/0356750 A1 Nov. 12, 2020

(30) Foreign Application Priority Data

Jan. 30, 2018 (CH) .................................... 00106/18

(51) Int. Cl.
*G06K 9/00* (2006.01)
*G06K 9/62* (2006.01)
*G06T 7/00* (2017.01)

(52) U.S. Cl.
CPC ....... *G06K 9/0012* (2013.01); *G06K 9/00013* (2013.01); *G06K 9/00899* (2013.01);
(Continued)

(58) Field of Classification Search
CPC ............. G06K 9/0012; G06K 9/00899; G06K 9/00013; G06K 9/6215; G06K 2009/0006;
(Continued)

(56) References Cited

U.S. PATENT DOCUMENTS 4,699,149 A 10/1987 Rice
7,550,707 B2 6/2009 Hashimoto et al.
(Continued)

FOREIGN PATENT DOCUMENTS

FR 2952737 A1 5/2011
WO WO-2014/060441 A1 4/2014

OTHER PUBLICATIONS

International Search Report and Written Opinion for PCT/IB2019/050708 dated Apr. 10, 2019, 5 pages.

*Primary Examiner* — John B Strege
(74) *Attorney, Agent, or Firm* — Blank Rome LLP

(57) ABSTRACT

The invention concerns a method and a biometric acquisition device for biometric vascular recognition and/or identification. The method comprising a step of capturing a plurality of veins images (116, 117, 118) of supposed subcutaneous veins (21) of a same inspecting portion (20) of a presented entity (2) from various converging orientations (113, 114, 115). The method further comprises a step of determine if said entity is a spoof based on estimated (Continued)

likelihood that said supposed subcutaneous veins within said plurality of veins images (116, 117, 118) are likely projections of solid veins (120).

20 Claims, 6 Drawing Sheets

(52) U.S. Cl.
CPC .......... *G06K 9/6215* (2013.01); *G06T 7/0014* (2013.01); *G06K 2009/0006* (2013.01); *G06K 2009/00932* (2013.01); *G06T 2207/30101* (2013.01)

(58) Field of Classification Search
CPC ........ G06K 2009/00932; G06T 7/0014; G06T 2207/30101
See application file for complete search history.

(56) References Cited

U.S. PATENT DOCUMENTS

| | | | |
|---|---|---|---|
| 9,667,946 B2 | 5/2017 | Didier | |
| 10,515,281 B1* | 12/2019 | Cherala | A61B 5/02007 |
| 2002/0048014 A1* | 4/2002 | Kono | G06K 9/00013 |
| | | | 356/71 |
| 2007/0217663 A1* | 9/2007 | Iizuka | G06K 9/0012 |
| | | | 382/124 |
| 2009/0232362 A1 | 9/2009 | Otsubo et al. | |
| 2011/0007951 A1* | 1/2011 | Mil'shtein | G06K 9/00033 |
| | | | 382/124 |
| 2011/0304720 A1 | 12/2011 | Kumar et al. | |
| 2013/0147726 A1* | 6/2013 | Dumont | G06K 9/00912 |
| | | | 345/173 |
| 2017/0053175 A1 | 2/2017 | Tussy | |
| 2017/0262689 A1* | 9/2017 | Suwald | G06K 9/0002 |

* cited by examiner

METHOD AND DEVICE FOR BIOMETRIC VASCULAR RECOGNITION AND/OR IDENTIFICATION

RELATED APPLICATIONS

This application is a national phase of PCT/IB2019/050708, filed on Jan. 29, 2019 which claims the benefit of Swiss Application No. CH00106/18, filed on Jan. 30, 2018. The entire contents of these applications are hereby incorporated by reference.

FIELD OF THE INVENTION

The present invention concerns a method and a device for a biometric vascular recognition and/or identification system permitting to recognize and/or identify an individual based on his vascular biometric.

DESCRIPTION OF RELATED ART

There is an increasing demand on efficient methods and systems providing robust recognition or identification of individuals, not only for security and governmental services but also for fighting abuse and unfairness in some public and private activities.

Various biometric technologies have thus been developed, notably based on fingerprints and, lately, on vascular biometrics.

U.S. Pat. No. 4,699,149 describes an apparatus for the identification of individuals based on subcutaneous blood vessels, in particular of the wrist.

US2002/0048014 describes a method and a system for identifying a person based on matching a previously stored image with one of a plurality of images of finger's veins acquired in many directions, reducing the influence of relative rotational position of the finger with respect to the imaging sensor of the system.

U.S. Pat. No. 7,550,707 describes a biometric authentication system based on 3D matching of finger's veins structures that are reconstructed from images of veins taken at various depths within the finger.

Finger vein biometrics provide a more accurate authentication over fingerprint-based technology, not only due to stronger differences existing between veins patterns of individuals, but also on intrinsically robustness against natural and artificial alterations of the skin surfaces. However, finger vein biometric authentications can be still subject of malicious attempts by presenting falsified presentation of biometric vein patterns.

US2011304720 describes a device and a method of automated personal identification that is robust against falsified presentations based on presenting vein pattern printed on a paper. The disclose solution comprises an acquisition of images under visible and NIR illuminations so as to detect imposer presentations.

US2009232362 describes a biometric authentication based on acquisitions of sequences of vein images at short interval so as to detect malicious presentations.

However, these methods and systems provide either a solution against some particular malicious presentations or they require important computational resources for recognize and/or identify an individual.

BRIEF SUMMARY OF THE INVENTION

The aim of the invention is to obviate, or at least to mitigate, the disadvantages of knowns vein biometric methods and devices.

In particular, the aim of the invention is to provide a computational efficient method and arrangement providing a reliable recognition and/or identification of an individual based on vein biometric of a part of his body.

According to the invention, these aims are achieved by means of the method of claim 1 and the device of claim 16.

The proposed solution provides a reliable recognition and/or identification of individuals by effectively detecting and thus rejecting falsified presentations of vein pattern. The anti-spoofing function of the proposed solution is incisive as based on an analysis of 3D features of the supposed subcutaneous veins of the presented entity.

The method and the device can be configured to operate on vascular biometric of an entity, the entity being a part of the body of the individual, e.g. a finger or fingertip, a hand, a wrists, an eye of the individual. The method and the device can also be configured to operate, simultaneously or sequentially, on vascular biometrics of more entities, such one or more fingers or fingertips, one or both hands, one or both wrists, and/or one or both eyes of the individual.

Moreover, the proposed solution can be integrated in system having limited computational resource as the proposed solution is massively based on data processing of two-dimensional (2D) objects (e.g. vascular pattern). However the anti-spoofing function takes benefit of a analysis of the presented entity in three dimensions (3D), the computational complexity of this task is at first optimized by limiting this analysis to a smaller portion of the subcutaneous regions of the entity. In another embodiment, this task is further optimized by performing one or more comparison of 2D objects (e.g. 2D vascular pattern) within images. The recognizing and/or identifying an individual can thus be entirely based on comparisons of veins within images.

Moreover, the proposed solution is compatible (i.e. usable in combination) with biometric vascular recognition and/or identification systems based on state-of-the-arts technique for recognizing and/or identifying an individual based on comparing vascular pattern and/or description within two images.

Preferably, the veins images are provided by radiating the entity presented to the biometric vascular system by a first electromagnetic radiation being a near-infrared radiation (also called "NIR" or "IR-A DIN", i.e. electromagnetic radiations having a wavelength from 0.75 µm up to 1.4 µm). This radiation allows an acquisition of subcutaneous veins while rejecting other disturbing elements. In fact, skin, tissue, and bone are mostly transparent to NIR light (notably in the spectrum of 0.7-0.9 µm) at the contrary of hemoglobin (Hb) and deoxygenated-hemoglobin (deoxy-Hb).

In a particular embodiment, the anti-spoofing function is based on comparing and/or matching pattern of supposed subcutaneous veins within veins images. This operation permits to efficacy detect not only ink-printed spoof but also other surfaces-based falsified presentations.

In another particular embodiment, the anti-spoofing function is based on determine at least a portion of a supposed subcutaneous vein within each veins images that are likely projections of a same solid vein portion (of the inspecting portion) along their respective converging orientations. This operation permits to efficacy detect a larger typologies of falsified presentations.

These embodiments are particularly advantageous as they provide a detection of falsified presentations of vein pattern without reconstructing the entire 3D subcutaneous vein pattern of the inspecting portion, further limiting the computational complexity of the anti-spoofing function.

In a particular embodiment, an individual is recognized and/or identified based on a single biometric image consisting in one of the veins image. Preferably, the biometric image consists in the vein image provided by the camera placed in front of the flat of the finger (i.e. the convex surface of the most distal phalanx of the finger that is naturally devoid of fingernail). An individual can thus be recognized and/or identified based on an estimated (e.g. computed) likelihood that the sub-cutaneous veins within this biometric image likely match the subcutaneous veins within the reference image.

In a particular embodiment, an individual is recognized and/or identified based on a set of biometric images consisting in more of the veins images. Advantageously, the biometric images consist in the entire set of veins images captured along distinct orientations. An individual can thus be recognized and/or identified by weighting the likelihoods provided by comparing each biometric image within the reference image. This approach permits to provide a better recognition/identification of individuals and/or a better robustness against falsified presentations.

In one embodiment, the finger likelihood is either the maximal value or the minimal value within the likelihoods provided by the biometric images. The first variant provides a better recognition and/or identification rate while decreasing the detection rate of fake presentations of vein pattern with respect to a single vein image approach. The second variant provides a better robustness against fake presentations, while slightly decreasing the recognition/identification rate.

In another embodiment, the likelihoods provided by the biometric images are quantized (i.e. represented in a multiple-level system, e.g. 2-level representation) by separately comparing them with one or more thresholding reference. An individual can thus be recognized and/or identified by applying a voting logic to these 2-level quantized (binary) likelihoods, e.g. X-over-Y (wherein y correspond to the numbers of cameras and x<=y). This approach permits to pursuit a more reliable recognition and/or identification of individuals by increasing both the recognition/identification rate and the robustness against falsified presentations, with respect to the single biometric image approach.

In another embodiment, an individual is recognized and/or identified based on a single biometric image obtained from at least two of the plurality of the veins image. The biometric image is obtained by projecting the sub-cutaneous veins each of vein image on a same blending surface, and then by blending the projected veins together within a single image.

This embodiment permits to introduce, in the single biometric image, subcutaneous veins belonging to portions adjacent to the inspecting portion of the supposed biological entity so as to be more robust against relative rotation thereof (notably finger, fingertips, wrist rotation) around its longitudinal axis (e.g. axis of symmetry).

In one embodiment, the entity presented to the biometric vascular recognition and/or identification system is radiated by a second electromagnetic radiation, preferably within the visible spectrum (i.e. electromagnetic radiations having a wavelength from 0.4 μm up to 0.7 μm).

This visible radiation permits an acquisition of an image of the visible appearance of the presented entity. This validating image permits to targets a detection of falsified presentation in form of a printed vein pattern. A validating image acquired according the same converging orientation and the same optical of one of the vein images permits to detect them by superposing the NIR image with the visible image.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
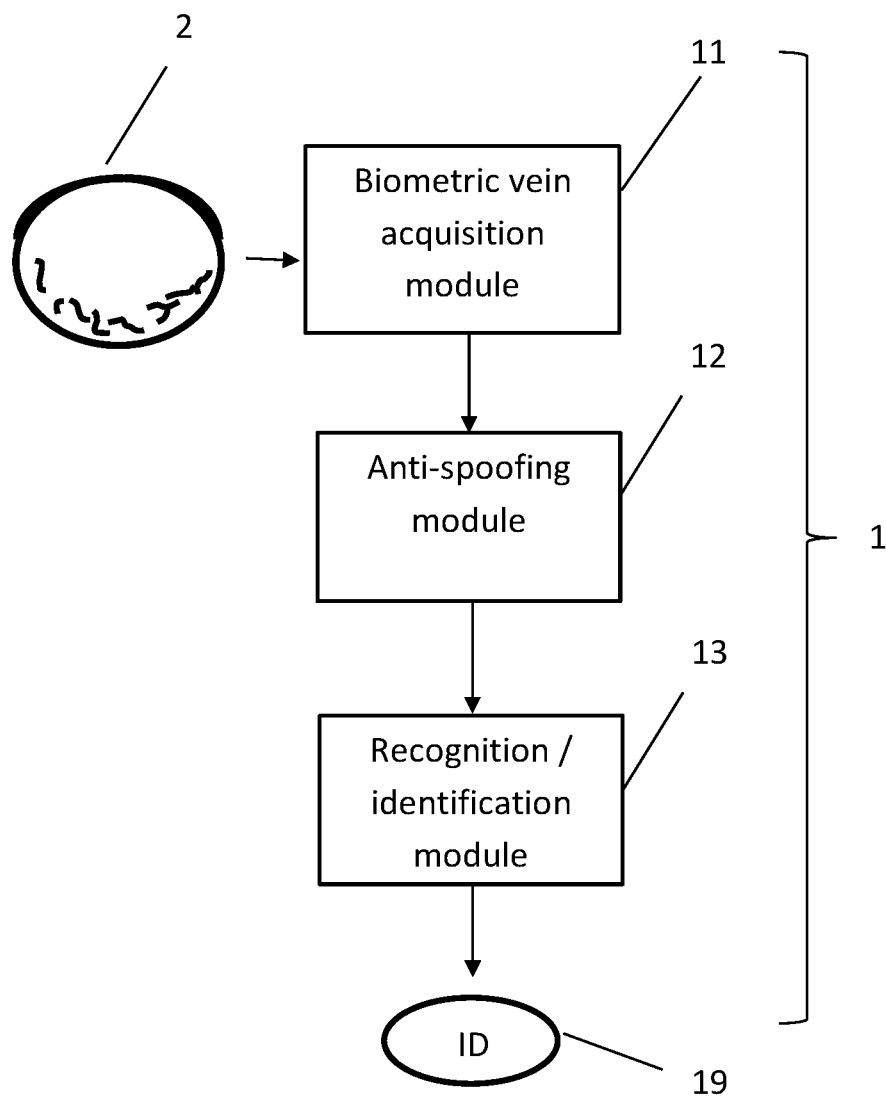
FIG. 1 shows a schematically view of a biometric vascular recognition and/or identification system.

FIG. 1 shows an exemplary embodiment of a biometric vascular recognition and/or identification system 1 for recognize and/or identify an individual based on his vascular biometric of a part of his body. In this exemplary embodiment, the entity is a finger 2.

The vascular biometric can also be a vein pattern of a hand, a wrist or a eye, or of another subcutaneous portion of (a preferably convex or at least flat part of) the body of the individual.

The biometric vascular system 1 comprises:

a biometric acquisition module 11 for acquiring a vascular biometric of a given entity (e.g. a finger 2, an hand, a wrist or an eye) of an individual;

an anti-spoofing module 12 for deciding if the presented entity to the biometric acquisition module 11 is a genuine body part or a spoof;

a recognition and/or identification module 13 for recognize and/or identify the individual based on the acquired vascular biometric so as to provide an indication 19 about an ID/recognition of the individual, when the presented entity is considered as a genuine body part (i.e. no spoof is detected).

The biometric vascular recognition and/or identification system 1 can comprises a single device including the above listed modules 11, 112, 13. Alternatively, the biometric vascular recognition and/or identification system 1 can be implemented by a plurality of standalone, remotely connected devices.

In the context of ID/recognition of individuals, a spoof is a falsified presentation of biometric pattern that is/was presented to the biometric vascular system 1 for forcing the system to identify and/or recognize another (absent and/or unwilling) individual.

In the exemplary embodiment of the biometric vascular system 1, the system 1 is configured to capture a plurality of veins images 116, 117, 118 of supposed subcutaneous veins 21 (i.e. real or falsified subcutaneous veins) of a given entity being a distal portion of the finger 2, notably of the most distal phalanx of the finger. The term "image" indicates a two-dimensional representation of a particular sensed physical phenomenon.

Each image is captured along a distinct and converging orientation 113, 114, 115, i.e. a non-parallel orientation tending to a same spatial region, even to a same point in the space (e.g. incident orientations). Preferably, the system 1 is configured so as the various converging orientations 113 converge within the biological entity (e.g. finger 2). Preferably, the converging orientations 113, 114, 115 spatially lay on a common plane being substantially perpendicular to the longitudinal (e.g. symmetry) axis of the given entity (e.g. distal portion of the finger), when the given entity is presented to the biometric system.

Preferably, the images are simultaneously acquired or within a short delay (less than a 100 ms, preferably less than 10 ms) so as to avoid involuntary, or even voluntary, translations or rotations of the finger between images. In fact, these movements and/or rotations lead to a mismatch between captured portion of the finger within images as well as to a modification of the relative angular relationships between the converging orientations thereof. Such as mismatches can decrease the detection/identification rate of the system and/or the robustness against falsified presentations.

Figure 2:
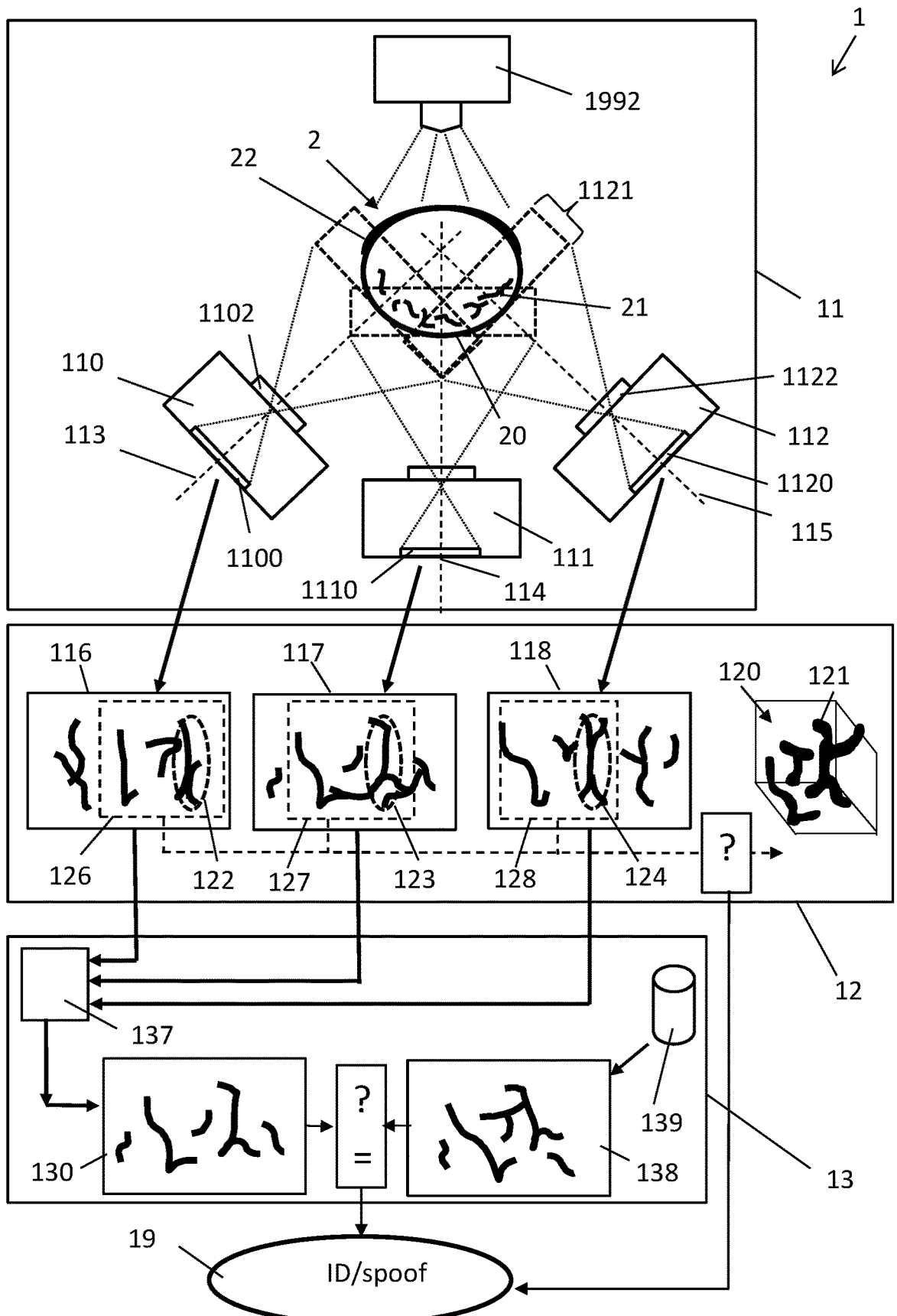
FIG. 2 shows a schematic representation of an exemplary embodiment of the proposed solution.

In the exemplary embodiment of FIG. 2, the system 1 comprises a plurality of cameras 110, 111, 112 configured to provide the vein images 116, 117, 118 along a set of predefined converging orientations 123, 124, 125. Preferably, the converging orientations 113 of the set converge within the presented entity being considered as a finger or fingertips.

According to the common sense, a camera is an optical device providing an image, i.e. a two-dimensional representation, of a particular sensed physical phenomenon, notably electromagnetically radiations. The orientation of the camera is defined as being the line 123, 124, 125 being substantially perpendicular to the surface of the image sensor 1100,1110,1120 that passes through the aperture of the optical system 1102,1112,1122 thereof (notably through the ideal pinhole of the camera).

In the exemplary embodiment of FIG. 2, the veins images are provided by sensing near-infrared radiations passing through the entity being a distal portion of the finger. Sensed near-infrared radiation allows an acquisition of hemoglobin within subcutaneous veins while rejecting other disturbing elements such as skin, tissue, and bone.

The illustrated biometric vascular recognition and/or identification system 1 is thus provided with an irradiation source 1192 configured to provide a near-infrared radiation so as to irradiate the entity (in this embodiment a distal portion of the finger), while the plurality of camera are configured to be sensitive to near-infrared radiation passing trough said portion of the biological entity.

Advantageously, each camera can be further spatially arranged and configured so as to obtain a depth of field 1121 spatially coinciding with a 5 mm-depth subcutaneous region of the biological entity (i.e. a region spatially located between the surface of the entity up to a depth of 5 mm), preferably with a 3 mm-depth subcutaneous region. This arrangement permits to render the camera insensitive to (e.g. vascular) objects located outside said subcutaneous region.

This configuration is advantageously used when the dimension and/or a relative position of the entity in the body is appropriate to let irradiations to pass through the entity, e.g. a finger, a hand, and a wrist of the individual.

The captured vein images are then provided to the anti-spoofing module 12 for deciding (detecting) if the entity 2 being presented to the biometric acquisition module 11 is likely a fake (biological) entity, i.e. the entity is either a genuine body part or a spoof.

The system 1 is configured so that each of the plurality of veins images comprises supposed subcutaneous veins of a same portion of the presented entity. This configuration permits the anti-spoofing module 12 to decide if the entity 2 is a genuine part or a spoof by checking if these veins are likely projections of hypothetically solid veins 120 (i.e. veins presenting a three dimensional structure or pattern) located inside the inspecting portion, along the converging orientations 113, 114, 115 of the veins images.

This anti-spoofing approach provides a better robustness against malicious attempts based on presentations of falsified surfaces as these malicious presentations have limited capabilities to represented complex three dimensional patterns such as those of subcutaneous veins.

The anti-spoofing module 12 is thus configured to decide (or determine) that the entity 2 being or not a spoof by estimating (e.g. computing) a likelihood that the supposed subcutaneous veins within the veins images 116, 117, 118 are projections of at least a solid vein 120 along the converging orientations 113, 114, 115 of the cameras.

The likelihood can be a numerical probability, a (digital) hint, or a simple (digital) indication that the supposed subcutaneous veins within the veins images (likely) arose from either a falsified presentation of veins pattern or from genuine veins.

The spoof likelihood can be estimated (e.g. computed) by taking advantage of the fact that projections of genuine subcutaneous veins along converging orientation would lead to observable, distinct two-dimensional patterns. The likelihood can be thus estimated or computed by comparing a pattern 126 of supposed subcutaneous veins within a first of the veins images 116 with a pattern 127, 128 of supposed subcutaneous veins within a second and/or a third of these veins image 117, 118. The aim of the comparison is to detect similarities between patterns of veins images of the same inspection portion along converging orientation, e.g. by matching these portions together, so as to detect a likely presentation of a falsified surface. The presented entity can be thus assumed to be a fake if the similarity ratio between the portions of distinct veins images (i.e. the spoof likelihood) passes a pre-defined threshold ratio (e.g. 30%).

Alternatively or complementarily, the spoof likelihood can be estimated by determining that a portion 122 of a supposed subcutaneous vein within a first image 116 and a portion 122 of a supposed subcutaneous vein within a second and/or a third of these images 116, 117 are likely projections of a same hypothetically solid vein portion 121 (of the inspecting portion) along their respective converging orientations 113, 114,115.

The solid vein portion 121 can be extrapolated, for example, from a disparity map or by triangulation using two images provided by two cameras having converging orientations.

These approaches for estimating the likelihood, i.e. to decide that the presented entity is a fake, are particularly advantageous as they provide a detection of falsified presentations of vein pattern without reconstructing the entire 3D subcutaneous vein pattern of the inspecting portion, limiting thus the computational complexity required by the anti-spoofing function.

When no spoof is detected or assumed, the system 1 is also be configured, e.g. by his recognition and/or identification module 13, to recognize and/or identify an individual based on his vascular biometric. An individual can thus be recognized and/or identified by comparing the already acquired subcutaneous veins within a reference image 138 and subcutaneous veins within at least a biometric image 130-134 obtained from one or more of said veins image 113, 114, 115.

In the exemplary embodiment of FIG. 2, a biometric image generator 137 provides either one biometric image or a sequence of biometric images 130 by selecting one or more of the veins images that are successively compared with the reference image 138 so as to recognize and/or identify the individual.

In a particular embodiment, the biometric images consist in one of the veins image. Preferably, the biometric images consist in the vein image provided by the camera placed in front of the entity (e.g. the flat of the finger, i.e. the convex surface of that is naturally devoid of fingernail). An individual can thus be recognized and/or identified based on an estimated or computed likelihood that the sub-cutaneous veins within this image likely match the subcutaneous veins within the reference image.

The image reference 138 is advantageously a tagged image, i.e. provided with additional information concerning a (computer-readable) ID of an individual, and stored in local, shared or remote database 139. The database can be part of the biometric vascular system 1. Alternatively, the database can be located within another remotely connected device, such as a server.

The comparison of subcutaneous veins within a reference image and sub-cutaneous veins within a biometric image can be based on (deformable or scale-invariant) template matching, veins features matching and/or by veins interest point detection and cross-verification.

Figure 3:
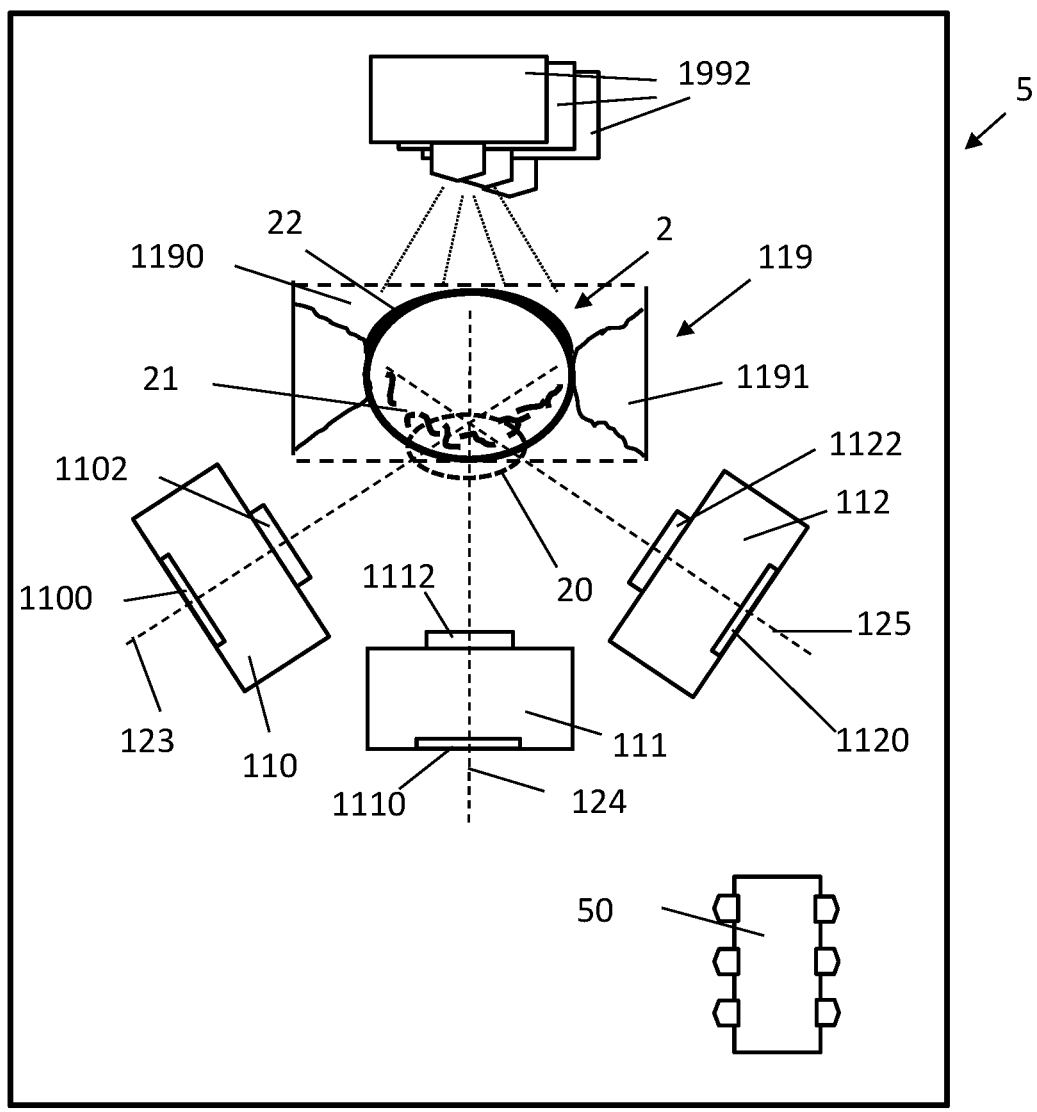
FIG. 3 shows an embodiment of the proposed biometric acquisition device.

FIG. 3 shows an embodiment of a biometric acquisition device 5 for the biometric vascular recognition and/or identification system 1.

The biometric acquisition device 5 comprises, in particular:

a support 119 for receiving a given entity (in the exemplary embodiment the biological entity is a distal portion of a finger 2) of an individual;

a plurality of cameras 110, 111, 112 configured to capture a plurality of images 116, 117, 118 of subcutaneous veins 21 of a same inspecting portion 20 of the presented entity 2) from a set of distinct and converging orientations 123, 124, 125, when the distal portion of the finger is received by the support; and a computing unit 50 configured to control and/or implement the biometric acquisition module 11, the anti-spoofing module 12 and/or the recognition and/or identification module 13.

The computing unit 50 can be any type of electronic circuits such as a generic programmable circuit (e.g. an electronic microcontroller, a microprocessor, a DSP) or a dedicated electronic circuit.

The support 119 is provided with surfaces destined to enter in contact with portions of the entity (finger) so as to provide a given spatially relationship between the biological entity and the cameras 110, 111, 112 when the entity is received by the support.

Advantageously, the support 119 is dimensioned by considering a model of the biological entity. In case of a finger, the distal portion of the finger can be modelled (considered) as a cylinder having a given diameter representing a typical finger diameter of a given, adult population.

The biometric acquisition device 5 comprises an irradiation source 1192 for providing a near-infrared radiation that point to the distal portion of the finger, notably oriented towards the fingernail 22. The illustrated irradiation source consists in a line of LEDs spatially aligned with the longitudinal axis of the finger when received by the support.

The cameras of the biometric acquisition device 5 are thus configured to be sensitive to near-infrared radiation passing trough said distal portion of the finger.

In order to avoid parasite irradiation, the support can be configured to obstruct irradiation provided by the source and passing outside the finger by using material not-transparent to NIR.

Advantageously the biometric acquisition device 5 comprises a visible light source (not illustrated) configured to illuminate the distal portion of the finger when received by the support. The cameras are thus configured to be sensitive to visible radiation passing through or reflected on the distal portion of the finger.

Biometric acquisition device can further be configured so as each camera has a depth of field covering a 5 mm-depth subcutaneous region of the most distal phalanx of the finger, preferably a 3 mm-depth subcutaneous region, when the distal portion of the finger is received by the support. Advantageously, the biometric acquisition device 5 can be configured so as the ⅗ mm-depth of field of each camera starts on the external surface of the cylinder representing the typical finger and used to dimension the support.

In particular, the illustrated biometric acquisition device 5 comprises three distinct cameras radially located in front of the flat of the finger, when the distal portion is received by said support, so as to provide images of subcutaneous veins 21 from a set of three converging orientations 113, 114, 115.

The three converging orientations 113, 114, 115 lay on a common plane being substantially perpendicular to the symmetry axis of the distal portion of the finger when received by the support. Advantageously, the biometric acquisition device 5 can be configured so as the three converging orientations converge to a point laying on the symmetry axis of the cylinder representing the typical finger and used to dimension the support.

Preferably one of these cameras is located substantially in front of the flat of the finger (i.e. the camera is orientated toward and substantially perpendicular to the surface of the flat of the finger), when the finger is received by the support. The other two cameras are then laterally located with respect to this central located camera so as their orientations form an angle of 45°+/−10° with the orientation of the central positioned camera.

The support 119 of the exemplary embodiment of FIG. 3 is in form of a cavity 1990 of the biometric acquisition device 5 having internal surfaces for receiving a distal end of a finger when inserted in the cavity. Advantageously, a NIR not-transparent, resilient material 1191 is placed on lateral sides of the internal walls of the cavity 1190, advantageously in form of foam-type material. This material is configured to enter in contact with lateral portion of the finger, when inserted in the cavity, so as to fill the empty space between the lateral surface of the finger and the lateral walls of the cavity.

Advantageously, the computing unit 50 is configured to control the acquisition of the vein images and to estimate (e.g. to compute) the above described likelihood that the supposed subcutaneous veins within said images are likely projections of solid veins along said converging orientations.

In particular, the computing unit 50 can be thus configured to compare and/or matching a pattern 126, 127, 128 of subcutaneous veins within one image with a pattern 126, 127, 128 of subcutaneous veins within another image. The computing unit 50 can be thus, alternatively or complementarily, configured to determine a portion 122, 123, 124 of supposed subcutaneous veins within each image that are likely projections of a same solid vein portion 121 along the set of converging orientations.

The illustrated biometric acquisition device is a portable device advantageously provided with powering means, such as a power pack, for powering the active components thereof, notably the cameras, the computing unit and the radiations source(s).

Figure 4:
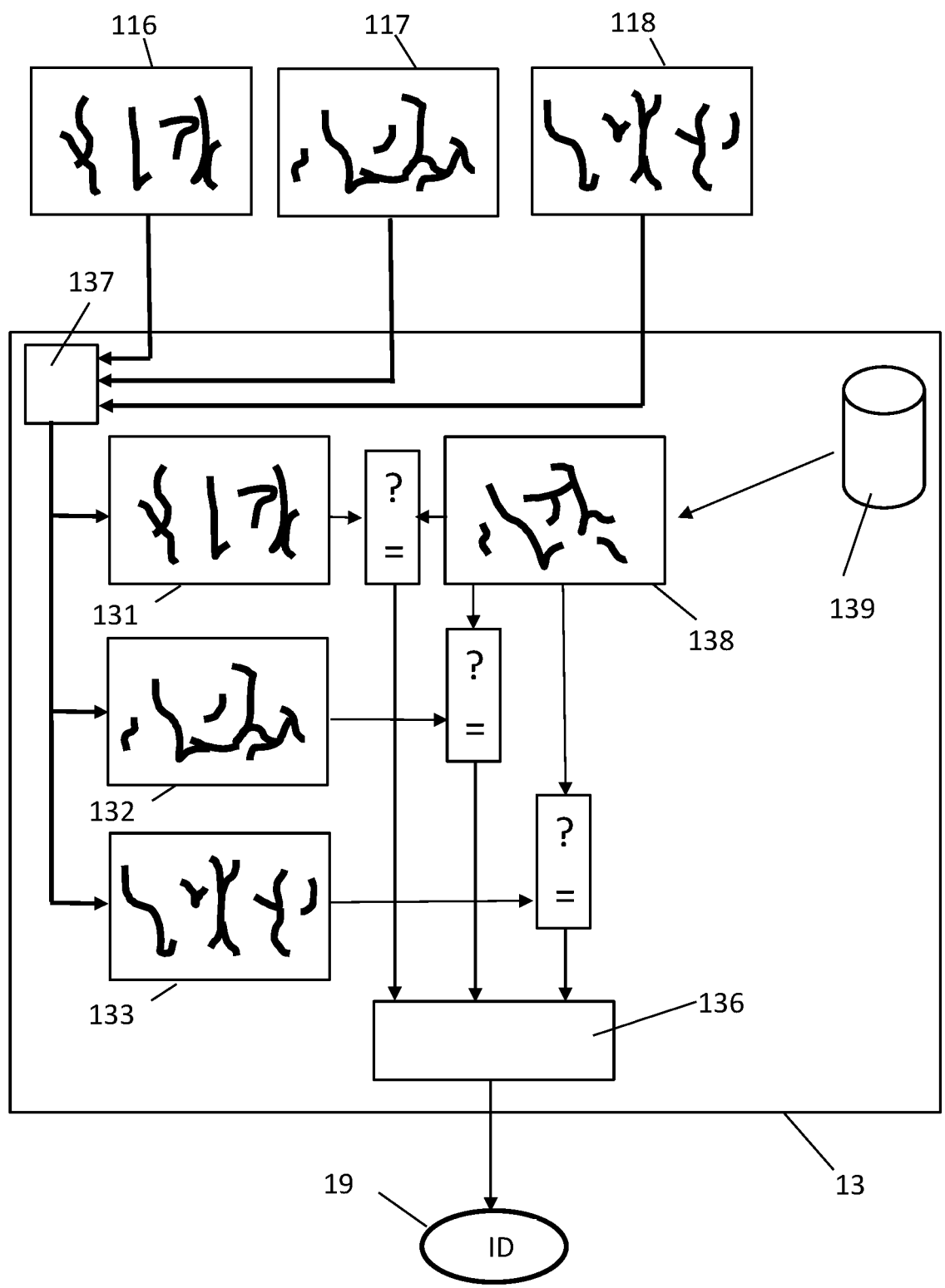
FIG. 4 shows a schematic representation of a first variant of the proposed solution.

FIG. 4 shows a particular embodiment of the system 1, wherein an individual can be recognized and/or identified by weighting the likelihoods generated by individually comparing each veins image within the reference image.

The biometric image generator 137 is thus configured to provide a sequence of biometric images 131-133 being a concatenation of the veins images 116, 117, 117 provided by the biometric acquisition module 11 and/or the anti-spoofing module 12. The illustrated embodiment further comprises a decision unit 136 configured to provide the indication 19 about an ID/recognition of the individual based on these comparisons.

The decision unit 136 can provide an ID/recognition of the individual by weighting the single likelihoods provided by comparing each biometric image within the reference image.

The decision unit 136 can, for example, provide an ID/recognition of the individual based on the maximal value and/or the minimal value of the single likelihoods provided by the biometric images.

The decision unit 136 can, for example, provide an ID/recognition of the individual based on a voting logic applied to (binarized) likelihoods, e.g. 2 over 3. In this configuration, the likelihoods provided by the biometric images are binarized (i.e. represented in a two-level system) by individually comparing them with a thresholding reference. An individual can thus be recognized and/or identify by applying a voting logic to these binarized or quantized likelihoods, i.e. binary likelihoods. This approach permits to increase the recognition/identification rate and the robustness against falsified presentation.

Figure 5:
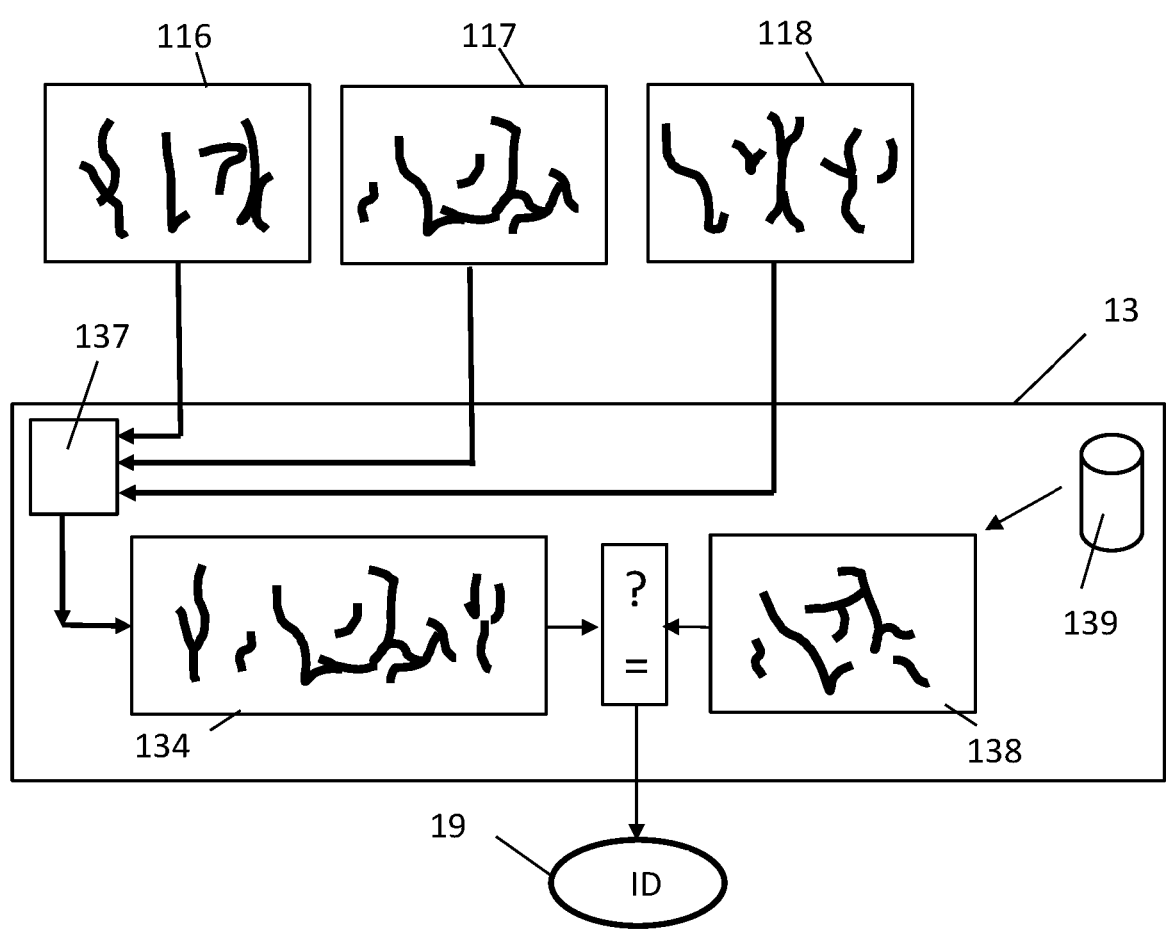
FIGS. 5 and 6 show a schematic representation of a second variant of the proposed solution.
Figure 6:
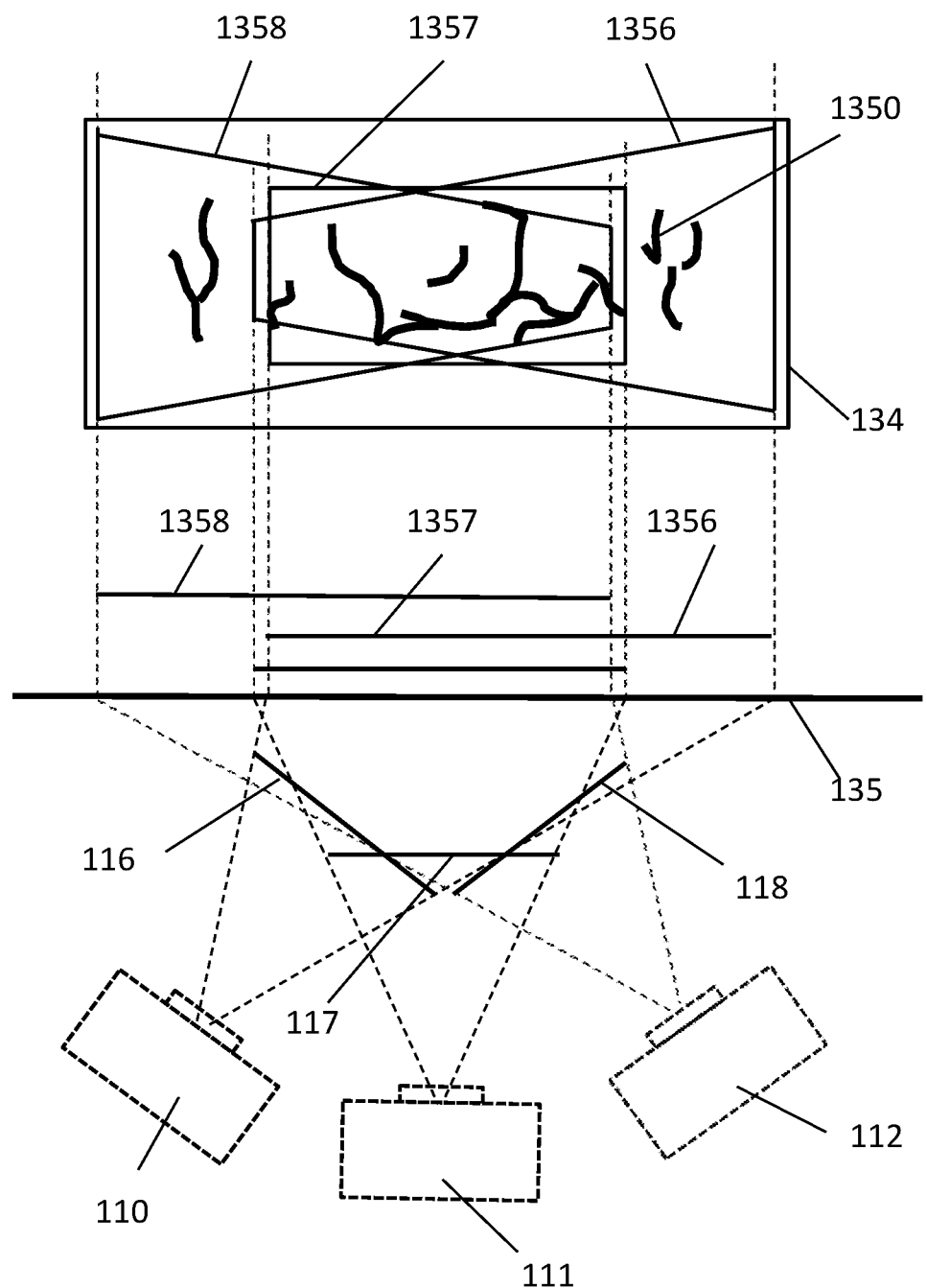

FIGS. 5 and 6 shows another particular embodiment of the system 1. In this embodiment, an individual can be recognized and/or identified by comparing the reference image 138 with a single biometric image 134 being obtained by processing the veins images 116, 117, 117 provided by the biometric acquisition module 11 and/or the anti-spoofing module 12.

The biometric image generator 137 is thus configured to provide the biometric image 134 by:

projecting of the supposed sub-cutaneous veins of each of the veins images 116, 117, 118 on a same blending surface 135; and then by blending the projected supposed sub-cutaneous veins 1350 together within a single image 134.

The blending surface is a virtual flat plane, preferably spatially located so as to substantially touch or cross the inspecting portion 20 of said entity 2. Advantageously, the blending surface is parallel to the symmetry axis of the cylinder representing the typical finger and used to dimension the support.

A step of correcting the optical distortions and aberrations introduced by each camera into the provided vein images can advantageously precede the step of projecting of the supposed subcutaneous veins on the same blending surface. A corrected image of the vein image can be thus created by warping it according to the intrinsic parameters of each camera so as to obtain a near-ideal pinhole image of the supposed sub-cutaneous veins.

The blending operation can comprises a step of fusing the elements of the images, at the level of either the image's pixel or image's displayed objects.

Alternatively, the blending operation can be executed, for example, by means of the Laplacian pyramid blending algorithm. The obtained blended image can thus be corrected using the contrast limited adaptive histogram equalization (CLAHE) method.

LIST OF REFERENCE NUMERALS

1 Vascular recognition or identification system
11 Biometric vein acquisition module
110,111,112 Camera
1100,1110,1120 Image sensor
1121 Depth of field
1102,1112,1122 Lens/optical system
113,114,115 Image acquisition orientation
116,117,118 Veins image of supposed subcutaneous veins
119 Support for a distal portion of a finger
1190 Cavity
1191 Resilient and foam-type material
1192 NIR source
12 Anti-spoofing module
120 Solid/3D veins
121 Portion of a solid/3D vein
122,123,124 Portion of supposed subcutaneous vein
126,127,128 Pattern of supposed subcutaneous veins
13 Recognition and/or identification module
130-134 Biometric image
135 Blending surface
1350 Projected sub-cutaneous veins
1353,1354,1355 Image with projected sub-cutaneous veins
136 Decision unit
137 Biometric image generator
138 Reference image
139 Database with references image
19 ID or recognition indication
2 Finger of an individual
20 Portion of the finger
21 Subcutaneous vein
22 Fingernail
5 Biometric acquisition device
50 Processing unit

The invention claimed is:

1. Method of biometric vascular recognition and/or identification, comprising:
   presenting an entity to a biometric vascular recognition and/or identification system;
   capturing a plurality of veins images of supposed subcutaneous veins of a same inspecting portion of said entity from a plurality of converging orientations;
   estimating a likelihood that said supposed subcutaneous veins within said plurality of veins images are projections along said orientations of solid veins of the inspecting portion;
   deciding, based on said likelihood, whether the entity is a genuine body part or a spoof.

2. The method according to claim 1, wherein said step of estimating the likelihood comprises a step of
   comparing and/or matching a first pattern of supposed subcutaneous veins within one of said veins images with a second pattern of supposed subcutaneous veins within another of said veins images.

3. The method according to claim 1, wherein said step of estimating the likelihood comprises a step of determining a first portion within one of said veins images and a second portion within another one of said veins images, wherein the first and second portions comprise projections of a same solid vein portion along their respective converging orientations.

4. The method according to claim 1, comprising recognizing and/or identifying an individual based on one or more of said veins images and a reference image of subcutaneous veins.

5. The method according to claim 4, wherein
recognizing and/or identifying an individual comprises separately comparing and/or matching each of the veins images within the reference image.

6. The method according to claim 5, wherein said step of recognizing and/or identifying an individual comprises steps of
computing and/or estimating an image likelihood for each vein image by individually comparing each vein image with the reference image; and
recognizing and/or identifying an individual based on an outcome computed from said computed image likelihoods.

7. The method according to claim 6, wherein computing the outcome comprises:
quantizing the computed and/or estimated image likelihoods by comparing them with a given threshold, and applying a voting logic to said quantized likelihoods.

8. The method according to claim 4, wherein said step of recognizing and/or identifying an individual comprises:
obtaining a biometric image by projecting the supposed sub-cutaneous veins each of each of the veins images on a same blending surface, the blending surface being a virtual flat plane; and
comparing and/or matching said biometric image sub-cutaneous veins within the reference image.

9. The method according to claim 8, wherein said biometric image is obtained by blending the projected supposed sub-cutaneous veins together within a single image.

10. The method according to claim 1, wherein capturing a plurality of veins images comprises radiating said entity by a first electromagnetic radiation being a near-infrared radiation.

11. The method according to claim 10, wherein said step of deciding whether the entity is a genuine body part or a spoof also comprises:
capturing an additional image of the entity being radiated by a second electromagnetic radiation that is distinct from the first electromagnetic radiation; and
comparing and/or matching said additional image with one or more of said veins images.

12. The method according to claim 11, wherein said additional image is captured along one of said converging orientations.

13. The method according to claim 1, wherein a first and a second of said converging orientations are spatially arranged so as to form an angle in a range from 450 up to 135°.

14. The method according to claim 2, wherein said step of comparing and/or matching the first pattern with the second pattern comprises a step of
assuming the entity being a fake if a similarity ratio between the said first and second pattern passes a pre-defined threshold ratio;
said threshold ratio being 30%.

15. Biometric acquisition device for a biometric vascular recognition and/or identification system, the device comprising:
a support for receiving an entity being a part of a body of an individual;
a plurality of cameras configured to capture a plurality of images of subcutaneous veins of a same inspecting portion of the entity from various converging orientations, when said entity is received by said support;
a computing unit configured to:
estimate a likelihood that said supposed subcutaneous veins within said images are projections along said converging orientations of solid veins of the inspecting portion, and to
deciding, based on said likelihood, whether the entity is a genuine body part or a spoof.

16. The biometric acquisition device according to claim 15, wherein the computing unit is configured, for estimating said likelihood, to:
compare and/or match a pattern of subcutaneous veins within one image with a pattern of subcutaneous veins within another image.

17. The biometric acquisition device according to claim 15, wherein the computing unit is configured, for estimating said likelihood, to:
determine a first portion within one of said veins images and a second portion within another one of said veins images, wherein the first and second portions comprise projections of a same solid vein portion along their respective converging orientations.

18. The biometric acquisition device according to claim 15, further comprising
an irradiation source configured to provide a near-infrared radiation pointing to said entity;
wherein said plurality of camera are configured to be sensitive to near-infrared radiation passing trough said entity.

19. The biometric acquisition device according to claim 15, wherein
each camera is arranged to have a depth of field covering a subcutaneous region of the entity from a surface of the entity up to a depth of 5 mm, when the entity is received by said support, so as to be insensitive to objects located outside said subcutaneous region.

20. The biometric acquisition device according to claim 16, wherein the computing unit is configured to assume the entity being a fake if a similarity ratio between the said pattern passes a pre-defined threshold ratio;
said threshold ratio being 30%.

* * * * *